United States Patent Office 3,442,922
Patented May 6, 1969

3,442,922
IMINODIACETATE ORGANOTIN, ANTIMONY, BISMUTH, TITANIUM AND GERMANIUM CHELATES
Horst G. Langer, Cochituate, Mass., assignor to The Dow Chemical Company, Midland, Mich., a corporation of Delaware
No Drawing. Filed Apr. 9, 1964, Ser. No. 358,624
Int. Cl. C07f 7/22; A01m 9/20; A61k 27/00
U.S. Cl. 260—429.7
8 Claims

ABSTRACT OF THE DISCLOSURE

Organo metal chelates of synthetic polyamino polycarboxylic acids, wherein the metal has part of its valence satisfied by chelation with acid groups on a terminal nitrogen and the remainder by organo substituent group.

---

This invention relates to certain new organo-metallic compounds which may be characterized as alkyl and aryl metallochelate compounds, wherein a metal atom of a polyvalent character is bound with a single nitrogen or terminally by the chelating agent, and also to a method for the production of these compounds.

Metallo-organic compounds generally can be quite varied. Often, they are characterized by combinations of very unusual properties. In the instant case, the organo-metallic-chelate compounds prepared are characterized by their containing metal, inorganic and organic groups, wherein the metal can be made available as an ion. The compounds have usefulness in such applications as the prevention of dental caries where it is desired to add a tin fluoride, for example, to a tooth cleaning composition and yet avoid the development of a tinny taste in the product.

It is accordingly a fundamental object of this invention to provide organo-metallic compounds in a form such that the metal is available, but in small quantity as an ion, and it is available partially as a chelate.

Other objects and advantages of the invention will in part be obvious and in part appear hereinafter.

The compounds, which are embodied in this invention may be described as having formulas which can be written by reference to the following drawing and explanatory text:

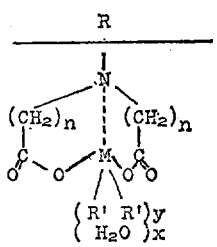

$x$ and $y$ being small integers such that the valence of M is fully satisfied:
wherein the respective arbitrary substituents indicated are defined as follows:

M is a metal, trivalent or tetravalent, selected from the group consisting of germanium, tin, lead, titanium, zirconium, hafnium, thorium, arsenic, antimony, bismuth, silicon, aluminum, gallium, indium, thallium;

R is H, alkyl, aryl, substituted aryl, substituted alkyl, or

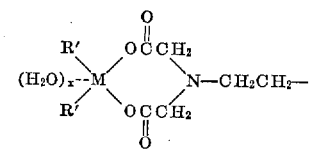

where $x$ is 0, 1, 2 or 3;

R′ is an organic group connected to M by means of an electron donating linkage through a coordinate bond, R′ being independently selected from the group consisting of lower molecular weight alkyl and aryl groups, methyl, ethyl, propyl, butyl, pentyl, hexyl, heptyl, aryl, phenyl, tolyl, cyclohexyl.

From the formulas given by the representation and definitions, it will be apparent that the compounds are characterized by a structure in which the metal atom is part of a fused chelate ring and, in addition, carries organic appendages, a special case, being one based on ethylene diamine tetraaectic acid as follows and will be found to correspond to ethylene diamino diacetic acid:

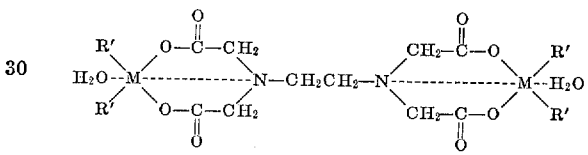

Inasmuch as certain of these compounds prepared in accordance with this invention have indicated usefulness for a variety of combinations of properties, it is sufficient merely to mention here a few of the said compounds. Thus, the following is a representative list of a few typical compounds in accordance with this invention: diphenyl tin (IV) iminodiacetate chelate of ethylene diamine tetraacetic acid; dimethyl tin (IV) iminodiacetate chelate of ethylenediamine tetraacetic acid; the same tin, lead chelates of hydroxyethylethylenediamine triacetic acid.

In considering compounds of this character and how their properties render them useful for a variety of purposes, it is of value in developing the concepts to recognize that good chemical theory states that in physiological processes metals are transported from cell to cell or within tissue through chelation reactions. That is, chelation may be looked upon as a rather natural phenomenon in which the metal is literally plucked from one environment into another. Thus, the chemistry of certain synthetic amino acid compounds indicates that they involve only a special case of chelation and are of value because in the special case the metal is bound within a five or six member ring. The compounds involved in this invention have properties which become quite interesting, because the metal at a sort of mid plane, as indicated in the drawing below, is chelated via two of its valences while the remaining valences are occupied by ordinary organic groups. That is, the metal, in being transported through a physiological system, for example, might, under certain circumstances, surrender the organo groups more readily than it would the chelating groups. Thus, the compounds, taking the diphenyl tin chelate of ethylene diamine tetraacetic acid as typical, can be formulated as follows:

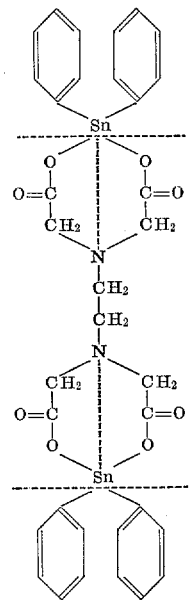

It will thus be seen that above the line through the metal of the compound, which may be looked upon as a sort of plane, a chelate ring is involved employing only terminal nitrogen and that below the line ordinary organo-metallic connections are involved.

The method of preparation of these compounds is direct and illustrated in the examples which follow. It should be understood that the compounds are synthesized by determining in advance the form of structure desired and then putting those components of structure together.

From the structure outlined, it should be apparent that the compounds are characterized by the following features:

(1) Only terminal nitrogen atoms of the chelating agents are involved.

(2) In the chelating agent carrying a plurality of acid groups, usually 2, per terminal nitrogen, all acid groups will be involved.

(3) Salt formation beyond the formation of the compounds of this invention is not possible because all acid groups are involved.

A structure thus is provided for studying the organo-metallics. They are incorporated into the chelate as shown and, in this form, the R—M structure is available for study by having been stabilized in the chelate form. The chelate form mole-for-mole essentially includes two metal atoms, thereby making it quite active biologically.

The following imino acids are typical of those useful in the Example I:

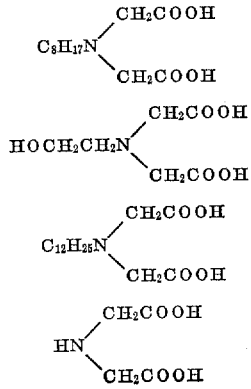

Thus, in place of EDTA used in Example I, any of these imino acids can be used.

EXAMPLE I 16.4 of dimethyltinoxide ($(CH_3)_2Sn=O$) is suspended in 500 ml. water. To this suspension is added 14.6 g. of EDTA acid, in small portions and under stirring. The mixture is allowed to stir overnight and the reaction product is filtered and washed with water. Increased temperature (60°) increases the rate of reaction. The amount of water used is not critical. The ratio of $2(CH_3)_2Sn=O$ to $1H_4Y$ must be maintained or the excess of either reactant will be found as an impurity in the product. The final pH should be between 5 and 6.

EXAMPLE II 0.24 g. of sodium hydroxide and 0.4 g. of iminodiacetic acid are dissolved in 2 ml. of water. To this hot aqueous solution was added a solution of 1.27 g. of triphenyl antimony dichloride in 2 ml. of tetrahydrofuran. Alcohol was added until a homogeneous solution was obtained and the reaction mixture was refluxed for four hours. Upon cooling a white crystalline precipitate of the triphenyl antimony iminodiacetate is obtained.

EXAMPLE III 2 millimoles of disodium iminodiacetate were dissolved in 1.5 ml. of water and 2 millimoles of phenyl bismuth dichloride in 1.5 ml. of tetrahydrofuran were added to this solution. The product formed is the monophenyl bismuth chelate of iminodiacetic acid.

In a more general form therefore, the preparation of compounds in accordance with this invention may be summarized as follows:

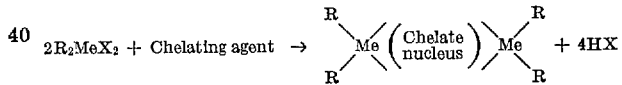

In other words, the organic portion of the metal compound may be of any of the organic radicals usually associated with organo-metallic oxide and hydroxide compounds. Thus, alkyl groups and aryl groups of little complexity or high degrees of complexity can be employed.

In the preparation of the compounds useful organo-metallics are typified by: diphenyl tin oxide, dimethyl tin oxide, diphenyl lead oxide, dimethyl lead oxide, the corresponding diethyl compounds; the corresponding dipropyl compounds; and as the chelating agent for forming the chelate ring portion of the molecule, I have used imino acids and their salts, as illustrated in Examples I, II, III, and the representative list of imino acids. Accordingly, in the organo-metallic compound used as the reactant, any trivalent metal compound containing one metal to carbon bond, may be used. In fact, any organo-metallic compound containing at least one carbon to metal bond and having a total valence of three or higher and also containing a reactive functional group such as oxide, alkoxyl, hydroxyl, acetate, etc., or in a lower valence state capable of being oxidized to a higher valence, can be used as the organo-metallic moiety which is the starting material. As for substitutions for the chelating agent used in the reaction, equivalents may be any compound capable of giving one or more coordinate bonds to the metal, the remaining valences of the metal to be occupied by ionic bonds.

Generally, the reaction conditions should take into account the fact that the acid form of the chelating agent is a product of the manner in which the process is carried out, and is of very low solubility in water. In order to have this very delicate operation in water take place, the temperature should be kept low. That is, it is preferable to keep the reaction temperature below 60° C., but best not to exceed 30° or 40° C., thereby to obtain a favorable rate but not upset the balance of the reaction. The amount of water is not critical, but the molar ratio of organo-metallic compound to chelating agent should be maintained as precise as possible. That is, for each terminal nitrogen in the chelating compound on which a ring is to be formed, one mole of the organo metal oxide (or other reactant) is the appropriate quantity.

At the higher pH's above about 5–6, the sodium salts of the chelates will be formed.

In recapitulation, therefore, it will be seen that the generalized drawing of the formulas of the compounds may be represented as a central metal atom, fused into a chelate ring, involving only one terminal nitrogen, and having its residual valences satisfied by organo-metal bonds. The organic groups may range in number from one to as many as the valence of the metal calls for and other conditions of definition will permit. In the formula, the chelate ring is formed through an electron donating atom, nitrogen, bound to the metal by a coordinate bond.

Another useful application of the metals is as the metal source in electroplating baths where the peculiar properties of the compounds are such that the tin metal can be made available at the bath without adding to the bath any amounts of extraneous metal ions.

The compounds are useful as insecticides and germicides. This apparently is due to the fact that the metal, or toxic metal, is in a form which is ingestible by an organism but can be released to do its damage. Thus, the bis dimethyl tin EDTA gives 100 percent kill of brown worm internal parasite at 300 r.p.m., 90 percent kill of California red scale at 25 p.p.m., 100 percent kill of cotton leaf perforator at 25 p.p.m., 79 percent kill of chick intestinal coccidion at .05 percent, 100 percent kill of Southern Army worm at 100 p.p.m. (7 days), 100 percent kill of house fly at 125 p.p.m., and inhibition of Aerobact, Aerogenes, pseudo Aeruginosa, *Salmonella typhosa*, Staphaureus, *Aspergillus terreus, Pullularia, pullulans*, and *Rhizopus nigricans* in saturated solutions.

The compounds have rather unusual properties, for example, the diphenyl tin salt of ethylenediamine tetraacetic acid forms an alcoholate with ethyl alcohol and methyl alcohol. With heating, the alcoholate will release all the organic parts of the molecule and form a tin IV chelate of ethylenediamine tetraacetic acid. The alcoholate salt is also soluble in water, which causes the alcohol to split off.

Following the general principles set forth for manufacturing the compounds and the reaction conditions typified in Example I, it will be noted from the following group of examples that the organo metallic compound in this form is readily prepared by reaction of stoichiometric amounts of its oxide or hydroxide with the acid form of the chelate. Thus, it need not be the complete acid form of ethylene diamine tetraacetic acid, but merely a form acid enough to react with the oxide or hydroxide put on the molecule and since the disodium salt gives an acid reaction, it is suitable.

EXAMPLE IV

Dimethyl germanium oxide is reacted in substantially molar amounts with ethylene diamine tetraacetic acid to form the organo germanium compound.

EXAMPLE V

Dibutyl lead oxide is reacted with ethylene diamine tetraacetic acid to produce a typical organo lead, i.e. dibutyl lead ethylene diamine tetraacetic acid imino chelate.

EXAMPLE VI

Dipropyl titanium oxide is reacted with ethylene diamine tetraacetic acid, per Example I to produce the dipropyl titanium organo compound of EDTA.

EXAMPLE VII

Diphenyl zirconium oxide is reacted with ethylene diamine tetraacetic acid to produce diphenyl zirconium compound of EDTA.

EXAMPLE VIII

Dipropyl hafnium oxide is reacted with ethylene diamine tetraacetic acid to produce dipropyl hafnium organo compound of EDTA.

EXAMPLE IX

Dimethyl thorium oxide is reacted with ethylene diamine tetraacetic acid to produce dimethyl thorium organo compound of EDTA.

EXAMPLE X

Triphenyl arsenic oxide is reacted with ethylene diamine tetraacetic acid to produce triphenyl arsenic organo compound of EDTA.

EXAMPLE XI

Triphenyl phosphorus oxide is reacted with ethylene diamine tetraacetic acid to produce triphenyl phosphorus organo compound of EDTA.

EXAMPLE XII

Phenyl antimony oxide is reacted with ethylene diamine tetraacetic acid to produce phenyl antimony organo compound of EDTA.

EXAMPLE XIII

Dimethyl silicon oxide is reacted with ethylene diamine tetraacetic acid to produce dimethyl silicon organo compound of EDTA.

EXAMPLE XIV

Diethyl aluminum oxide is reacted with ethylene diamine tetraacetic acid to produce diethyl aluminum organo compound of EDTA.

EXAMPLE XV

Ethyl gallium oxide is reacted with ethylene diamine tetraacetic acid to produce ethyl gallium organo compound of EDTA.

EXAMPLE XVI

Methyl indium oxide is reacted with ethylene diamine tetraacetic acid to produce methyl indium organo compound of EDTA.

In each of the Examples II–XVI, it should be noted that a terminal nitrogen and its two acetic acid groups are treated as one mole. Hence, the total molar ratio of organo metal oxide to EDTA was 2.0:1 in each case and the compounds formed, in accordance with infra red spectrum conformed to the formula:

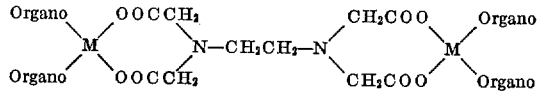

In the examples as given wherein the technique of Example I is followed, namely, that of suspending the oxide and chelating acid in water and maintaining them in contact with each other, the direct stoichiometric reaction proceeds, and oxides, dioxides and esters can be used but it should be noted that it is preferable to use as the compound, in fact necessary to use as the reactant compound, which is resistant to the hydrolysis in water. Generally, as the hydroxides and properties are well-known, the information concerning its reactability in water is directly obtainable. Where water hydrolyzes, it is desirable to shift to a non-aqueous reaction medium such as alcohol or a light hydrocarbon.

What is claimed is:
1. A compound having the formula:

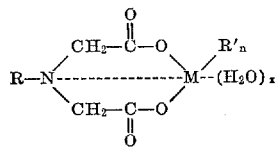

where R is H, alkyl, aryl, substituted aryl, substituted alkyl, or

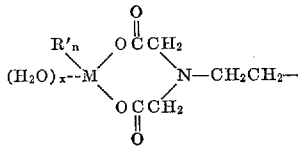

M is Sn, Sb, Ti, Ge, or Bi; R' is an alkyl or aryl group having up to eight carbon atoms; the symbol $n$ is 0, 1, or 2 depending on the valence of M; and $x$ is 0, 1, 2 or 3.

2. A compound in accordance with claim 1 which is the dimethyl tin imino chelate of ethylene diamine tetraacetic acid.

3. A compound in accordance with claim 1 which is the dimethyl tin imino chelate of hydroxy ethyl ethylene diamine triacetic acid.

4. A compound in accordance with claim 1 which is triphenyl antimony imino diacetate.

5. A compound in accordance with claim 1 which is phenyl bismuth imino diacetate.

6. A method of preparing a compound having a formula given by claim 1, which comprises reacting organo metallic compound containing at least one carbon-metal bond, having a total valence of at least three, with a polyamino polycarboxylic acid chelating compound, in a stoichiometric amount of one mole of metal for each mole of terminal nitrogen and maintaining said reaction mixture at a temperature below about 60° C. until the acid reacts with said solid compound.

7. The method in accordance with claim 6 in which the chelating compound is in acid form.

8. The method in accordance with claim 7 in which the metal compound is in the form of an organo metal halide.

References Cited
UNITED STATES PATENTS 3,120,550  2/1964  Langer _____ 260—429.7

TOBIAS E. LEVOW, *Primary Examiner.*

W. F. W. BELLAMY, *Assistant Examiner.*

U.S. Cl. X.R.

260—429, 429.1, 429.3, 429.5, 437, 440, 446, 447, 448, 448.2, 999; 424—288